(12) United States Patent
Ovesen et al.

(10) Patent No.: US 8,584,706 B2
(45) Date of Patent: Nov. 19, 2013

(54) VORTEX GENERATOR

(75) Inventors: Morten Ovesen, Malmo (SE); Curt Hallberg, Trelleborg (SE)

(73) Assignee: Watreco AB, Malmo (SE)

( * ) Notice: Subject to any disclaimer, the term of this patent is extended or adjusted under 35 U.S.C. 154(b) by 501 days.

(21) Appl. No.: 12/442,105

(22) PCT Filed: Sep. 28, 2006

(86) PCT No.: PCT/SE2006/001098
§ 371 (c)(1),
(2), (4) Date: May 10, 2010

(87) PCT Pub. No.: WO2008/039115
PCT Pub. Date: Apr. 3, 2008

(65) Prior Publication Data
US 2011/0083751 A1 Apr. 14, 2011

(51) Int. Cl.
*F15C 1/16* (2006.01)
(52) U.S. Cl.
USPC ......................................... 137/810; 137/811

(58) Field of Classification Search
USPC .................................................. 137/810, 811
See application file for complete search history.

(56) References Cited

U.S. PATENT DOCUMENTS

| | | | | | |
|---|---|---|---|---|---|
| 5,365,962 | A | * | 11/1994 | Taylor | 137/14 |
| 6,672,755 | B1 | * | 1/2004 | Potter et al. | 366/175.2 |
| 2004/0099614 | A1 | * | 5/2004 | Lehmann et al. | 210/787 |
| 2004/0244853 | A1 | * | 12/2004 | Harman | 137/808 |
| 2012/0097280 | A1 | * | 4/2012 | Hallberg et al. | 137/808 |

\* cited by examiner

*Primary Examiner* — Eric Keasel
*Assistant Examiner* — Daphne M Barry
(74) *Attorney, Agent, or Firm* — Volpe and Koenig, P.C.

(57) ABSTRACT

A vortex generator, designed to bring a medium into a controlled vortex motion, with a hollow inlet section (1) to direct the medium into the vortex generator. The inlet section consists of a rotational symmetric cavity (101) with a curved geometry (108). Furthermore, a vortex chamber (4a; 4b), inside which the vortex motion is to be established, is attached to the inlet section. The inlet section (1) contains at least one spiral-shaped conic channel for di-recting the medium from the rotational symmetric cavity to the vortex chamber. The vortex chamber is either trumpet-shaped (4a) or egg-shaped (4b).

34 Claims, 5 Drawing Sheets

A-A

VORTEX GENERATOR

CROSS-REFERENCE TO RELATED APPLICATIONS

This application is a National Phase filing under 35 U.S.C. §371 of International Application No. PCT/SE2006/001098, filed on Sep. 28, 2006, the contents of which is incorporated herein by reference in its entirety.

FIELD OF THE INVENTION

The invention pertains to a vortex generator, designed to bring a medium into a controlled vortex motion. The vortex generator has an inlet section for directing the medium into the vortex generator, and this inlet section comprises a rotational symmetric cavity with a curved geometry, and the vortex generator furthermore comprises, attached to the inlet section, a vortex chamber inside which the vortex motion is to be established. The invention also pertains to a method of purifying water.

TECHNICAL BACKGROUND

The already established technology of using vortex generators for the purpose of bringing a medium into a vortex motion is achieved in a number of different ways. The most common one is that the medium is forced into motion inside the vortex chamber by the use of guiding rails, which exert pressure. The problem with this approach is that as soon as the guiding rail comes to an end, the pressure also disappears. Another established method is to blow the medium into the vortex chamber tangentially as a homogenous mass with high pressure and high flow. This method generates a rotation of the medium, which is similar to the rotation of a solid body and eventually leads to turbulence. Yet another method is to use a kind of disc, which rotates at a high speed and thus pulls the medium with it. This results in high pressure in the periphery, which causes the structured vortex to quickly break down into turbulence.

Thus difficulties arise in certain cases where it is important to keep the flowing medium in a controlled vortex motion. When it comes to hydrocyclones, for instance, and combustion chambers in jet engines, the technique of blowing the medium into the chamber tangentially as a homogenous mass has been used, but one of the problems with this method is that in this case, flow is interrupted, resulting in turbulence. In a hydrocyclone, this interferes with the centrifugal separation effect and causes particles to be drawn into the accept flow. In jet engines, this causes the mixture of fuel and air to be of inferior quality, which results in a reduction in effectiveness. This also leads to the process requiring more energy and a higher usage of raw materials than if it were possible to control the vortex motion. The use of guiding rails to direct the flow is not efficient enough since the guiding effect disappears as soon as the guiding rail comes to an end. Another problem is that when the flowing medium is blown or forced into the vortex chamber in a homogenous and more or less laminar flow, the vortex does not form a spiral flow pattern, but would in this case also start to rotate in the manner of a solid body to eventually change to a turbulent flow.

An example of an established vortex generator, the purpose of which is to treat drinkable liquids, is described in DE-U-20 218 674.

Another vortex generator, called the Martin Vortex Generator, is marketed under the brand name Wirbelwasser® (www.wirbelwasser.de). The water in this vortex generator moves in a way that is similar to a solid body.

SUMMARY OF THE INVENTION

The purpose of the invention is to achieve a vortex generator which in different types of scenarios represents a better solution to the set of problems mentioned above, in such a manner that the flowing medium is directed into a controlled vortex motion.

This purpose is achieved using a vortex generator of the kind described at the beginning of this document, which has been given the characteristics defined in Patent claim 1. Preferred embodiments are laid out in Sub-Claims 2-11. The purpose is also achieved for a specific field of application using a method described in Patent claim 12.

The vortex generator, in accordance with the design of the invention, has an inlet section, which comprises at least one spiral-shaped conic channel for directing the medium from the rotational symmetric cavity to the vortex chamber. The vortex chamber is either trumpet-shaped or egg-shaped, and designed in such a way that the lengthwise cross-section of the trumpet-shaped inside of the vortex chamber is given by the function $f(x)=k*x^y$, where the following variation of the parameters signifies the area of definition of the vortex chamber's trumpet-shaped lengthwise cross-section: $8500<=k<=9000$, $-1,1<=y<=-1,0$, the function is defined between the starting value x0 and x0+250 units of length and where x0 varies according to: $70<=x0<=170$, and the egg-shaped inside of the vortex chamber is given by the function $f(x)=k_1*x^2+k_2*y^2-C$, where the following variation of the parameters signifies the area of definition of the vortex chamber's egg-shaped lengthwise cross-section: $18<=C<=21$, if $x<=0$ then $k_1>=0.003$ and $k_2>=0.005$ and if $x>0$ then $k_1>=0.002$ and $k_2>=0.005$.

Through the design of the invention, the medium receives an impulse towards self-organisation, similar to the vortex that forms when a bath is emptied, and the internal vortex motion is sustained by a slowing-down effect caused by the surface of the outer container. By giving an impulse to a flowing medium in this way, a durable and well-constructed vortex can be created, sustained and made to continue for longer after the initial impulse is given. The vortex generator, in accordance with the design of the invention, is able to generate a well-constructed vortex at a considerably lower pressure and flow than what can be achieved through already established technology. It also allows an efficient mixture of liquids and gases to be obtained, which leads to different processes becoming more cost-effective as they require less energy and less usage of raw materials. Furthermore, because of the way in which the vortex generator is constructed, at the centre of the vortex reduced pressure is formed, functioning as a vacuum pump which, for instance, can be used in the separation of gases or particles.

The medium should preferably be liquid or gaseous.

According to an embodiment of the invention, the vortex generator furthermore consists of a vortex concentrator, which is attached to the inlet section, and this vortex concentrator is positioned in such a way that at its outer surface, it is surrounded by a flow of the medium being directed from the spiral-shaped conic channel of the inlet section into the vortex chamber. This outer surface of the vortex concentrator is designed to slow down the flow so that a reduced pressure can form next to it. The vortex concentrator further increases the stability of the formed vortex.

According to an embodiment, the inlet section has a bevelled edge for the attachment of the vortex concentrator. This means that it is easy to attach the vortex concentrator.

The inlet section of the vortex generator may contain a central channel for directing a secondary flow of the medium from the rotational symmetric cavity of the inlet section to the inside of the vortex concentrator. In this case, the vortex concentrator also has an outlet section for directing the secondary flow from the inside of the vortex concentrator to the vortex chamber, and a channel disc positioned between the central channel and the inside of the vortex concentrator, and this channel disc has at least one slanted channel for directing the secondary flow from the central channel to the inside of the vortex concentrator. Using this design, a vortex can be created inside the vortex concentrator, and when this secondary vortex leaves the vortex concentrator it will, due to the higher pressure that exists inside the vortex concentrator compared to that in the vortex chamber, accelerate and shoot out into the vortex chamber at a high speed and rotation. The main vortex in the vortex chamber will as a consequence be concentrated further.

The inside of the vortex concentrator preferably comprises a rotational symmetric cavity. By doing so, the formation of vortices inside the vortex concentrator is strengthened.

According to an embodiment of the invention, a nozzle with at least one vortex channel is positioned inside the vortex concentrator, upstream from the outlet of the vortex concentrator. With the aid of the nozzle, the vortex forming inside the vortex concentrator is concentrated.

The inlet section of the vortex generator preferably comprises at least one wing protruding inside the inlet section. By having this addition, the medium that is directed into the inlet section is given an impulse, speeding up the formation of a vortex.

The wing should preferably be positioned upstream of the rotational symmetric cavity of the inlet section. The medium is thereby given an early impulse, so that the vortex motion is initiated even before the medium reaches the cavity of the inlet section.

On one of its surfaces turned towards the inside of the vortex chamber, the inlet section may have a rounded recess. This recess constitutes a part of the inner geometry of the vortex chamber and has the effect of further stabilising the vortex.

The vortex generator of the invention is advantageously arranged to purify water, by contaminants collecting in the centre of the vortex.

In accordance with the method for purifying water contaminated water is directed into the vortex generator, which is constructed according to the design of the invention. Contaminants are efficiently collected inside the centre of the vortex and can be directed away, while the purified water may pass radially outside of the contaminants.

DESCRIPTION OF PREFERRED EMBODIMENTS

Figure 1:
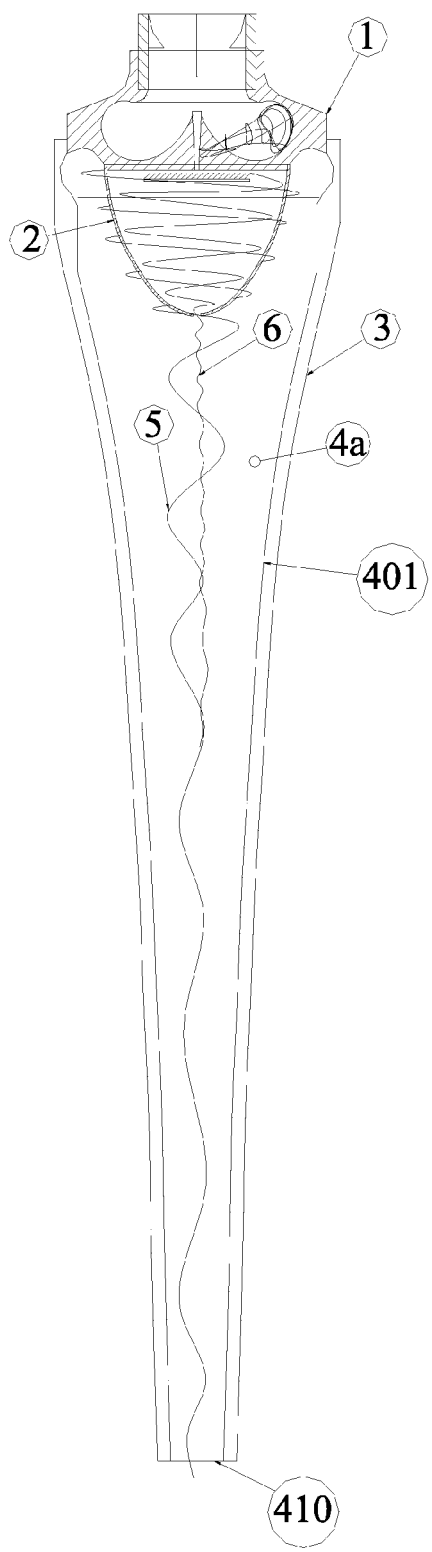
FIG. 1 and FIG. 2 show a cross-section of the whole construction with the two different geometries of the vortex chamber and how the different vortices are formed and structured, as well as how the inlet section, the vortex concentrator and outer vessel are assembled in relation to one another.
Figure 2:
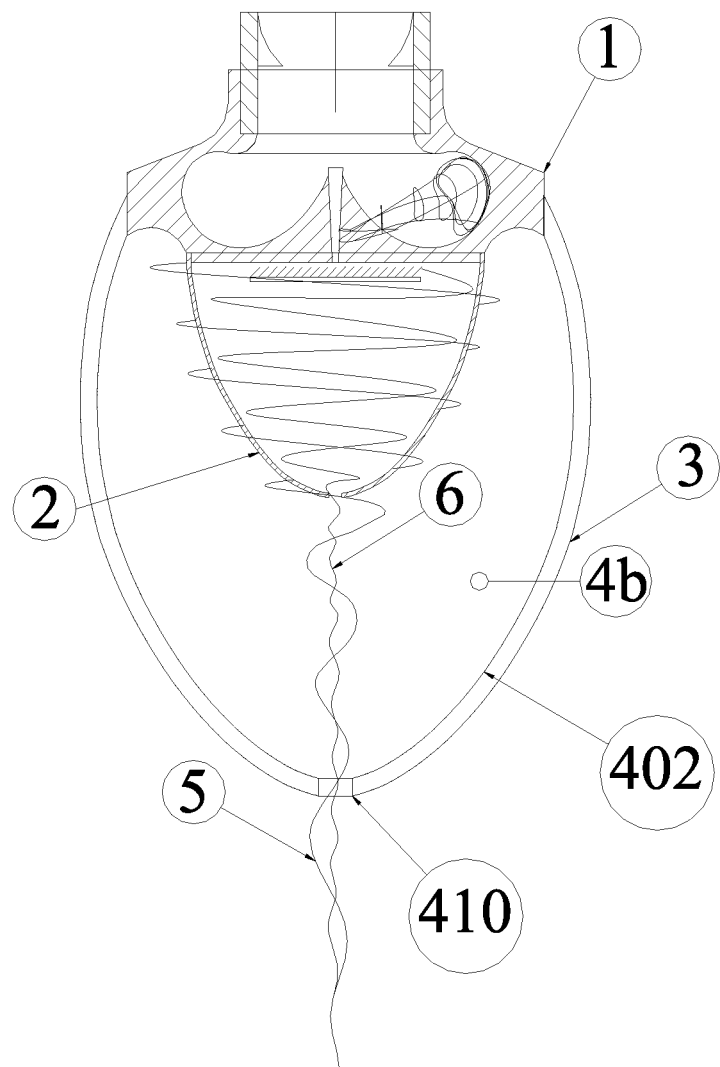
Figure 3:
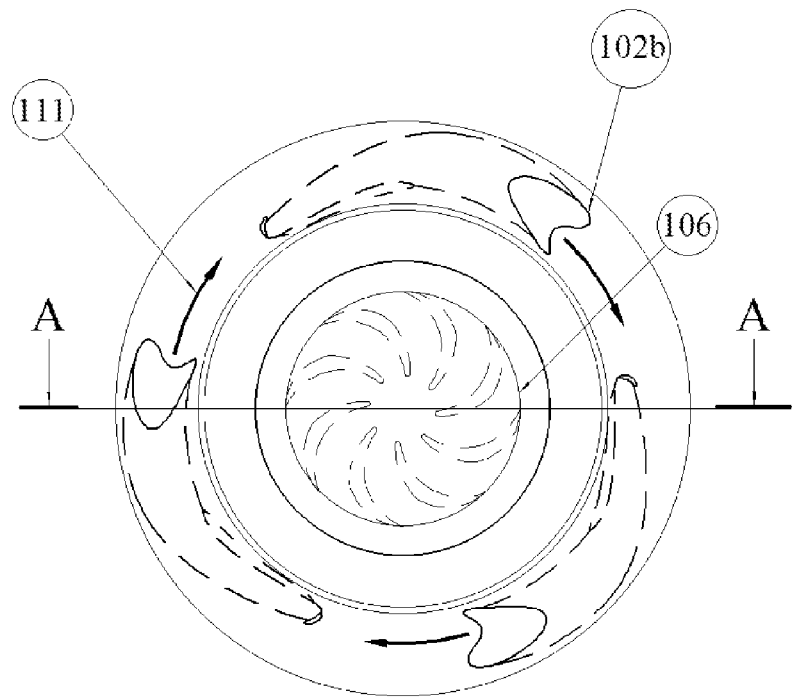
FIG. 3 shows a detailed image of the inlet section from below with an outlet aperture for the spiral-shaped and conic channels, as well as the channel disc which causes the secondary flow that runs centrally through to rotate.
Figure 4:
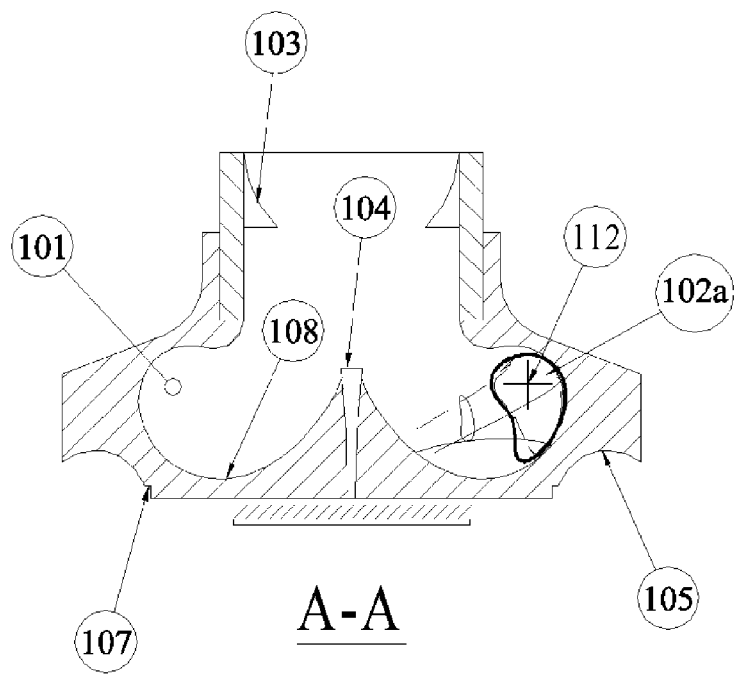
FIG. 4 shows a cross-section of the inlet section with impulse-generating wings, rotational symmetric cavity with curved geometry, and channels for the different secondary flows.
Figure 5:
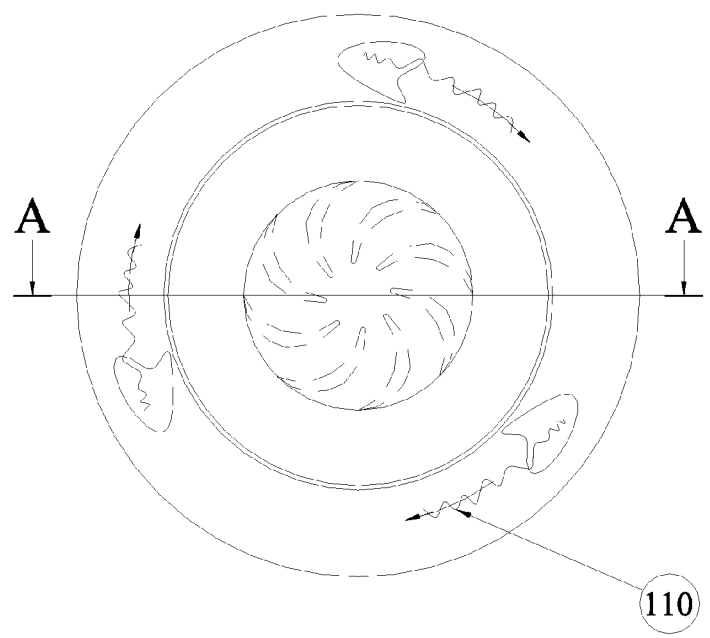
FIG. 5 shows the inlet section from below and how the different secondary flows shoot tangentially into the vortex chamber.
Figure 6:
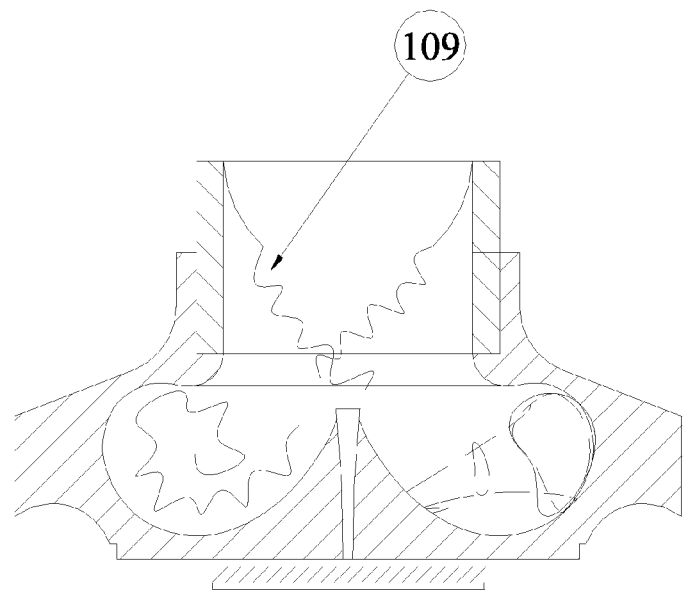
FIG. 6 again shows a cross-section of the inlet section, but this time how and where the different micro-vortices are formed, as well as how they are formed inside the rotational symmetric cavity, and how they subsequently are ejected into the spiral-shaped channels through the inlets of these channels.
Figure 7:
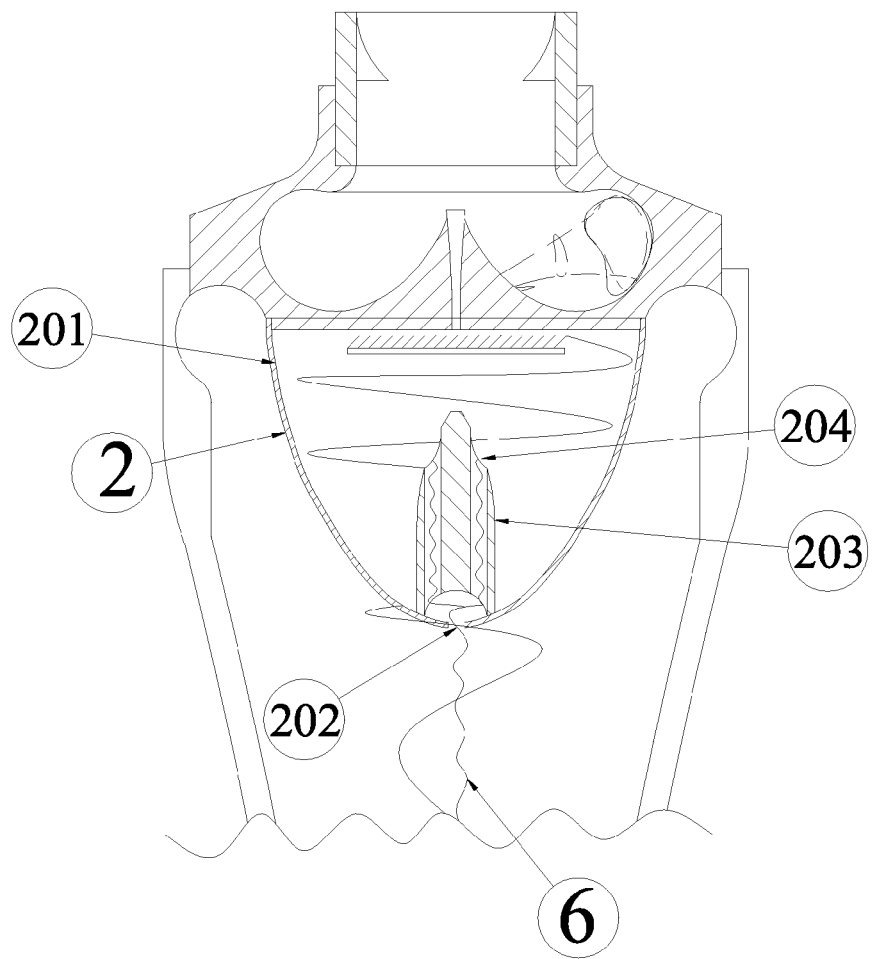
FIG. 7 shows a detailed image of the vortex concentrator, as well as how the different vortices are generated and formed around and inside the vortex concentrator.

The more detailed characteristics and advantages of the invention will be made apparent through the following detailed description. The invention consists of a new type of vortex generator, shown in FIG. 1 and FIG. 2, the purpose of which is to bring a flowing medium into a controlled vortex motion, with either a trumpet-shaped vortex chamber 4$a$ or an egg-shaped vortex chamber 4$b$.

The medium is given an initial rotation while simultaneously the finer structure of the vortex is already organised in the inlet section itself 1. By being directed in a manner described in detail below, it is made to rotate around the axis of the main vortex 5, while it is simultaneously rotating around the axis of its own flow in a multiple motion. The continued motion of the vortex is maintained by a slowing-down effect from the outer wall of the vortex chamber 4 ($a$ and $b$).

It could be said that the flowing medium is subjected to a process that starts with it being given an impulse towards self-organisation. The medium flowing through the opening in the inlet section 1 is set into an initialising rotation by wings 103, which on their pressure side are forcing the medium to start rotating. Due to the relatively low pressure on the reduced pressure side of the wings, some of the medium is sucked into tiny micro-vortices, which constitute the finer structure of the vortex. These micro-vortices are partially knitting themselves together into "bunches" of vortex threads, which constitute the core of the larger vortices that are formed in the channels 102 ($a$ and $b$).

When the rotating medium with bunches of vortex threads 109 flows into the rotational symmetric cavity 101, the medium is forced towards the periphery of the curved geometry 108. The rotating medium is flattened against the curved outer side of the cavity 101, and subsequently curls up as the curve turns upwards again, whereupon a rotating torus with bunches of vortex threads is formed inside the rotational symmetric cavity. Because the medium is pushed into the inlet section 1 with a certain amount of excess pressure, the outer part of the torus is forced into a number of channels 102 ($a$ and $b$), the inlet of which 102 $a$ is situated on the side of the rotational symmetric cavity. These channels 102 ($a$ and $b$) are conic and spiral-shaped, and lead tangentially into the vortex chamber 4 ($a$ and $b$). The conic shape of the channels 102 ($a$ and $b$) results in the surface area of the outlet section of the channels 102 $b$ being smaller than their inlet section 102 $a$. The rotating medium that is forced into the channels forms a larger vortex that is partly organised by the kidney-shaped geometry, and partly by the micro-vortices, which constitute the core of this vortex. The kidney-shaped geometry of the channels 102 (*a* and *b*) maintains the vortices within and facilitates their concentration. Because the channels are conic in shape, the vortices are made to rotate with an increasing speed as the radius reduces in size. Because the channels are spiral-shaped and the axis of their flow is positioned tangentially, the medium is pushed into the vortex chamber 4 (*a* and *b*) in this direction 110.

The different secondary flows are pushed into the vortex chamber 4 (a and b), which is made up of the inside of the outer vessel 3, the outside of the vortex concentrator 2, and the part of the bottom of the inlet section 1 which is not covered by the vortex concentrator 2. The medium emanating from the spiral-shaped channels 102 (*a* and *b*) of the inlet section is flowing tangentially in the direction 110 and starts rotating exactly below the inlet section's flexibly shaped attachment 105 to the vortex chamber. The medium is then forced to flow downwards and will at that point rotate around the vortex concentrator 2. The medium will be affected by the Coanda effect as it is rotating around the outer surface of the vortex concentrator 2. The result of this is that the medium will be attracted to the surface by the surface acting as a kind of brake, which creates reduced pressure right next to the surface and shapes the vortex in a three-dimensional motion down towards the tip of the vortex concentrator.

In the same way, reduced pressure is created close to the outer surface of the vortex chamber 4 (*a* and *b*), but since the vortex from the very start has more motion around the vortex concentrator 2, this reduced pressure does not affect the main vortex 5 as strongly. This results in the vortex being structured around the vortex concentrator and the reduced pressure that forms as the medium is swept around the vortex concentrator sucking the medium from the periphery in towards the surface of the vortex concentrator.

A secondary flow of the medium runs into the vortex concentrator 2 through the straight channel 104 and is pushed into the vortex concentrator through a nozzle consisting of a channel disc 106 with slanted channels which direct the secondary flow upwards in even smaller flows, which in their turn are pushed tangentially inwards on the inside of the vortex concentrator 2. The inside is shaped in the same way as the outside and thus creates a rotational symmetric cavity 201. As the flows of the medium are pushed against the sides they start to rotate and a vortex is formed. As the vortex reaches the tip of the inside of the vortex concentrator, it is able to move out into the vortex chamber 4*a* or 4*b* through an outlet aperture 202. Because pressure is higher inside the rotational symmetric cavity than in the vortex chamber, the vortex will accelerate in the vortex concentrator and shoot out of the tip at a high speed and rotation.

The vortex issuing from the tip of the vortex concentrator 2 consists of one or more secondary vortices twisting together like the strands in a rope as they meet inside the outlet aperture 202. The secondary vortices form inside a nozzle 203 inside the vortex concentrator. Inside the nozzle, there is at least one vortex channel 204, which catches and shapes the secondary vortices. The nozzle is conic in shape at the point where the channels open up towards the surrounding vortex. The medium in the vortex is pushed into the channels and creates small vortices here, which are forced towards the outlet aperture by the pressure. As the different secondary vortices meet in the outlet aperture, they are intertwined into a cohesive vortex. This part of the vortex, through its higher rotation and central flow, will create a reduced pressure, which will concentrate the main vortex even further.

The central vortex 6, which issues from the tip of the vortex concentrator 2, constitutes the very core at the centre of the main vortex 5, which is formed as the secondary flows are gathering around the vortex concentrator 2.

The inside of the vortex chamber 4 (*a* and *b*) will have a sort of slowing-down effect on the periphery of the medium, which lowers the speed of the peripheral flow. This outer vessel is in contact with the medium and has a surface that provides a stationary layer forming the basis of this aforementioned slowing-down effect. This results in the generation of a spiral-shaped visualisation of the flow, and that the continuing motion of the vortex is maintained. The lengthwise cross-section of the inside of the vortex chamber 4 (a or b) can be described as trumpet-shaped, or alternatively, egg-shaped, which also constitutes a suitable geometry for controlling the acceleration of the vortex.

The lengthwise cross-section of the inside of the trumpet-shaped 4*a* vortex chamber 401 is given by the function $f(x)=k^*x^y$, where the following variation of the parameters signifies the area of definition of the vortex chamber's trumpet-shaped lengthwise cross-section:
$8500 <= k <= 9000$, $-1,1 <= y <= -1,0$. The function is defined between the starting value x0 and x0+250 units of length and where x0 varies according to: $70 <= x0 <= 170$. Alternatively, an egg-shaped geometry 402 of the vortex chamber 4*b*, defined as the function $f(x)=k_1^*x^2+k_2^*y^2-C$, may be appropriate to direct the acceleration of the vortex in certain applications where the following variation of the parameters signifies the area of definition of the vortex chamber's egg-shaped lengthwise cross-section: $18 <= C <= 21$, if $x <= 0$ then $k_1 >= 0.003$ and $k_1 >= 0.005$ and if $x > 0$ then $k_1 >= 0.002$ and $k_2 >= 0.005$.

As the radius will reduce in the direction from the inlet section 1 towards the outlet 410 according to the given trumpet-shaped or egg-shaped function, the angular frequency of the vortex will increase according to the given geometry, since the momentum is preserved. The slowing-down effect by the periphery of the vortex chamber will still be active, with the result that the spiral-shaped flow profile will be twisted together yet further. By shaping the geometry in different ways, it is possible to control the acceleration of the angular frequency of the vortex, so that the original value of the peripheral speed is maintained.

The effect of the geometry of the vortex chamber 4*a* or 4*b* and the slowing-down effect at the periphery has the result that the vortex will increase its rotational frequency inwards towards the centre of the vortex, which in turn results in the flow profile lengthwise going from a rotation in the plane to a flow profile with a drawn-out rotation along the central axis. The pressure inside the vortex chamber is higher than on the outside, which is why the media is affected by the pressure in such a way that the central part, which is not subjected to the same slowing-down effect as the inner surface, achieves a higher axial speed. The vortex is transformed from a helix-shaped rotation with little increase to a rotation with a more axial direction, and with an axial flow at a high speed.

The difference between the trumpet-shaped geometry and the egg-shaped one is that with the trumpet-shaped one, a higher axial speed is achieved. This has as a result that the egg-shaped geometry is more suitable for nozzle applications where, for example, the medium is to be sprayed with a suitable dispersion image. The trumpet-shaped geometry is suitable for applications where a high initial velocity of the flowing medium is needed, for example, in combustion chambers in jet engines, or in water jet applications.

By giving an impulse to a flowing medium in the manner that is described above, a durable and well-structured vortex can be created and maintained, one that will continue a further distance beyond the impulse provider itself. Furthermore, the vortex is formed at a considerably lower pressure and flow, and with the same volume of the vortex chamber, in comparison with already established comparable technology. One advantage of using this invention is that it is possible to work with pressures as low as just above 0 bar, compared to already established technology, for instance hydro-cyclones, which start showing the effects only at considerably higher pressures.

The medium that is directed into the vortex generator can be gaseous or liquid, but it can also be a mixture of liquid and gas.

The vortex generator, in accordance with the design of the invention, can be used in several fields. It is particularly well suited to water purification, both when it comes to sewage purification and the production of drinking water. With the use of the vortex generator, particles can be removed from the water efficiently. The particles collect in the centre of the vortex and can be drained away. The purified water is able to pass radially outside of the impurities. Experiments have also shown that solutes, iron ions for example, can be removed from the water.

Since reduced pressure is created at the centre of the vortex, the vortex generator may be used in the separation of, for example, gases or particles. This property can, for instance, be used in the maintenance of ice in ice rinks. The water that is to be poured on the ice is degassed of air bubbles through reduced pressure, changing the flow properties of the water, which means that the water can be used at a lower temperature. Despite its lower temperature, the water flows easily into pores and cracks in the ice. This in turn results in the ice freezing more quickly and evenly, which means that the ice machine is in use for a shorter period of time. This saves energy and lowers maintenance costs. This degassing effect can also be used in the manufacture of snow using snow cannons, as well as in the manufacture of industrial ice.

Furthermore, the reduced pressure at the centre of the vortex can also be used to pull gases into a fluid. If air is allowed to be sucked into the water and the unit is used in a pond, a strong aeration of the water occurs, which is beneficial to fish, but also to the bacteria that break down nutrients in the water. In this way, it is possible to control the growth of algae. Water from the pond can be purified and oxygen added before the water is returned to the pond. In this way, the ecological balance of the pond can be maintained.

The reduced pressure at the centre of the vortex can also be used in a more general way for mixing substances. Powder, for instance, can be added and mixed with a liquid, a gas can be added and mixed with a liquid, or a liquid or gas can be added and mixed with a gas.

In this context, one field of application is irrigation, where, for example, fertilizers can be mixed with water before it is used. As in the manufacture of ice, the flow properties of the water can also be affected, so that the water becomes more suitable for irrigation of hydrophobic soil. The degassing effect can also be used in the manufacture of concrete, as the treated water better soaks into the concrete, thereby giving an increased durability to the finished concrete.

The vortex generator can also be used to exterminate bacteria and other microorganisms. The reduced pressure at the centre of the vortex has a bactericidal effect, as bacteria and other organisms first are subjected to pressure and then to reduced pressure. The bacteria are unable to endure this difference in pressure and die as a consequence.

Another bactericidal effect is to utilise the reduced pressure at the centre of the vortex to suck ozone into the vortex generator from an ozone generator. In this case, the ozone is distributed very efficiently in the water, which is why a swift extermination of bacteria occurs.

The extermination of microorganisms is useful in the treatment of ballast water in ships, for instance. Microorganisms live and multiply in the ballast water, and there is a risk that these microorganisms spread when the ship is emptied of ballast water in waters different from those where the ship was filled. Therefore, it is desirable to kill the microorganisms before the water is drained.

The vortex generator can also be used to reduce lime scale in water pipes, for example. Water that has passed through the vortex generator contains a smaller amount of calcite and a larger amount of aragonite. Aragonite has a smaller tendency to form lime scale than calcite does.

The invention claimed is:

1. A vortex generator comprising:
    an inlet section (1) defining at least one spiral-shaped conic channel (102a, 102b), in which spiral-shaped conic channel (102a, 102b) a fine structure of a fluid vortex (5) is generated so that said fine structure of the fluid in the conical channel (102a, 102b) is rotating around the axis of the fluid's flow direction; and
    a vortex chamber (4a, 4b) in fluid communication with the inlet section so as to form the main vortex (5) in the vortex chamber (4a, 4b),
    wherein the lengthwise inner cross-section of the vortex chamber is trumpet-shaped (4a) so as to maintain the continued multiple motion of the vortex (5), said trumpet-shape or egg-shape of the vortex chamber (4a, 4b) defining a fluid outlet at the end of the vortex chamber (410); and
    wherein the trumpet-shaped vortex chamber (4a) inner cross-section is given by the function $f(x)=k*x^y$, x being along the length and y being greater than or equal to $-1.1$ and less than or equal to $-1.0$ and k being a constant greater than or equal to 8500 and less than or equal to 9000.

2. The vortex generator of claim 1, further comprising an attachment (105) coupling the inlet section to the vortex chamber.

3. The vortex generator of claim 1, wherein the inlet section includes a rotationally symmetric cavity (101) with curved geometry (108).

4. The vortex generator of claim 3, wherein the fluid defines a rotating torus in the rotationally symmetric cavity.

5. The vortex generator of claim 1, wherein the channel is kidney-shaped in cross-section.

6. The vortex generator of claim 1, wherein the function is defined between the starting value x0 and x0+250 units of length, and wherein x0 is greater than or equal to 70 and less than or equal to 170.

7. The vortex generator of claim 1, further comprising a vortex concentrator (2) coupled to the inlet section.

8. The vortex generator of claim 7, wherein the inlet section (1) comprises a central channel (104).

9. The vortex generator of claim 8, further comprising a channel disc (106) positioned between the central channel (104) and the inside of the vortex concentrator, said channel disc (106) having at least one slanted channel for the direction of the fluid from the central channel (104) to the inside of the vortex concentrator.

10. The vortex generator of claim 1, wherein the inner of the vortex chamber slows down a fluid in the vortex chamber thereby defining an outer surface of a vortex (5) in the vortex chamber.

11. The vortex generator of claim 1, wherein at the outlet the fluid (5) has a twisted spiral-shaped flow profile.

12. The vortex generator of claim 1, wherein the vortex generator operates at a pressure that is lower than a pressure at which a hydro-cyclone starts showing effect.

13. The vortex generator of claim 1, wherein particles in the fluid collect in a center of a vortex (5) of the fluid in the vortex chamber, whereby the particles are drained away.

14. The vortex generator of claim 1, wherein fluid forms a jet at the outlet.

15. The vortex generator of claim 1, further comprising an outer vessel (3) laterally surrounding the vortex chamber.

16. The vortex generator of claim 1, wherein a diameter of the vortex chamber adjacent the inlet section is greater than adjacent the outlet.

17. The vortex generator of claim 1, wherein the inlet section (1) comprises a central channel (104).

18. The vortex generator of claim 17, further comprising a channel disc (106) positioned between the central channel (104) and the inside of the vortex chamber, said channel disc (106) having at least one slanted channel for the direction of the fluid from the central channel (104) to the inside of the vortex chamber.

19. A vortex generator comprising:
an inlet section (1) defining at least one spiral-shaped conic channel (102a, 102b), in which spiral-shaped conic channel (102a, 102b) a fine structure of a fluid vortex (5) is generated so that said fine structure of the fluid in the conical channel (102a, 102b) is rotating around the axis of the fluid's flow direction; and
a vortex chamber (4a, 4b) in fluid communication with the inlet section so as to form the main vortex (5) in the vortex chamber (4a, 4b),
wherein the lengthwise inner cross-section of the vortex chamber is egg-shaped (4b) so as to maintain the continued multiple motion of the vortex (5), said trumpet-shape or egg-shape of the vortex chamber (4a, 4b) defining a fluid outlet at the end of the vortex chamber (410); and
wherein the egg-shaped vortex chamber (4b) lengthwise inner cross-section is given by the function $f(x)=k_1*x^2+k_2*y^2-C$, x being along the length, y being perpendicular to the length and C, $k_1$ and $k_2$ being constants wherein C is greater than or equal to 18 and less than or equal to 21, and if x is less than or equal to zero then $k_1$ is greater than or equal to 0.003 and $k_2$ is greater than or equal to 0.005, and if x is greater than 0, then $k_1$ is greater than or equal to 0.002 and $k_2$ is greater than or equal to 0.005.

20. The vortex generator of claim 19, further comprising an attachment (105) coupling the inlet section to the vortex chamber.

21. The vortex generator of claim 19, wherein the inlet section includes a rotationally symmetric cavity (101) with curved geometry (108).

22. The vortex generator of claim 19, wherein the channel is kidney-shaped in cross-section.

23. The vortex generator of claim 19, further comprising a vortex concentrator (2) coupled to the inlet section.

24. The vortex generator of claim 19, wherein the inlet section (1) comprises a central channel (104).

25. The vortex generator of claim 24, further comprising a channel disc (106) positioned between the central channel (104) and the inside of the vortex concentrator, said channel disc (106) having at least one slanted channel for the direction of the fluid from the central channel (104) to the inside of the vortex concentrator.

26. The vortex generator of claim 24, further comprising a channel disc (106) positioned between the central channel (104) and the inside of the vortex chamber, said channel disc (106) having at least one slanted channel for the direction of the fluid from the central channel (104) to the inside of the vortex chamber.

27. The vortex generator of claim 19, wherein the fluid defines a rotating torus in the rotationally symmetric cavity.

28. The vortex generator of claim 19, wherein the inner of the vortex chamber slows down a fluid in the vortex chamber thereby defining an outer surface of a vortex (5) in the vortex chamber.

29. The vortex generator of claim 19, wherein at the outlet the fluid (5) has a twisted spiral-shaped flow profile.

30. The vortex generator of claim 19, wherein the vortex generator operates at a pressure that is lower than a pressure at which a hydro-cyclone starts showing effect.

31. The vortex generator of claim 19, wherein particles in the fluid collect in a center of a vortex (5) of the fluid in the vortex chamber, whereby the particles are drained away.

32. The vortex generator of claim 19, wherein the fluid is sprayed from the outlet.

33. The vortex generator of claim 19, further comprising an outer vessel (3) laterally surrounding the vortex chamber.

34. The vortex generator of claim 19, wherein a diameter of the vortex chamber adjacent the inlet section is greater than adjacent the outlet.

* * * * *